INVENTOR
JOSEPH M. O'CONNOR

# United States Patent Office 3,556,567
Patented Jan. 19, 1971

3,556,567
TUBE JOINTS
Joseph M. O'Connor, Chicago, Ill., assignor to Peerless of America, Incorporated, Chicago, Ill., a corporation of Illinois
Filed Feb. 10, 1969, Ser. No. 797,988
Int. Cl. F16l 25/00
U.S. Cl. 285—332.3      7 Claims

ABSTRACT OF THE DISCLOSURE

A tube joint having two bells physically interlocked against movement in either axial direction.

BACKGROUND OF THE INVENTION

This invention relates to tube joints and, more particularly, to tube joints which are particularly well adapted for joining two tubular members of different material.

It is a primary object of the present invention to afford a novel tube joint.

Tube joints, of course, have been heretofore known in the art. However, such joints as have been heretofore known have commonly had several inherent disadvantages such as, for example, forming restrictions to the flow of working fluid therethrough; not being effective to seal against the leakage of working fluid which is under pressure; not having the physical or structural strength sufficient to properly withstand the pushing, pulling, bending or twisting forces to which the joints are to be expected to be subjected in installations for which they are intended; being large and bulky in size; being difficult and expensive to construct and assemble; or being impractical and inefficient in construction and operation, and the like. It is an important object of the present invention to overcome such difficulties.

In many tube installations, such as, for example, in the condensers and evaporators used in refrigeration and air conditioning units, the tubes are commonly subjected to pulling, pushing, bending and twisting forces during the manufacture of such units, and during the operation thereof. It is an important object of the present invention to enable tubular members in such units, and the like, to be joined together in a novel and expeditious manner which affords a novel joint which is effective to withstand such forces.

Also, in many such installations it often is highly desirable, if not absolutely necessary, to connect two tubular members of different materials, with one of the materials being considerably softer than the other. It is an object of the invention to afford a novel tube joint which is well adapted for the effective joining together of tubes constructed of different materials, and to afford a novel and expeditious method of forming such a joint.

An object ancillary to the foregoing is to afford a novel tube joint which is particularly well adapted for the effective joining together of tubes constructed of different materials, wherein one of the materials is softer than the other, and to afford a novel and expeditious manner of forming such a joint.

Another object of the present invention is to afford a novel tube joint wherein the parts thereof are so constituted and arranged that they are effectively held against movement in any direction relative to each other, and, particularly, are positively held against any longitudinal movement relative to each other.

A further object is to afford a novel tube joint wherein an adhesive sealant may be incorporated therein, with effective protection being afforded in a novel and expeditious manner against the adhesive sealant entering the joint at places where it can contact working fluid passing through the joint.

Another object is to afford a novel tube joint which may be readily and economically produced commercially, and which is practical and efficient in operation.

Other and further objects of the present invention will be apparent from the following description and claims and are illustrated in the accompanying drawings which, by way of illustration, show the preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

SUMMARY OF THE INVENTION

The present invention affords a novel tube joint, and a novel method of making the same, wherein tubular members having bell portions on the ends of the body portions thereof may be firmly secured together against axial and rotative movement relative to each other, with a portion of one bell sloping inwardly into firm engagement with the outer face of an outwardly flaring portion of the other bell, and with a sealant disposed between the bells in such manner as to afford assurance that the sealant will not leak into the interior of the tubular members.

DESCRIPTION OF THE EMBODIMENTS SHOWN HEREIN

Figure 1:
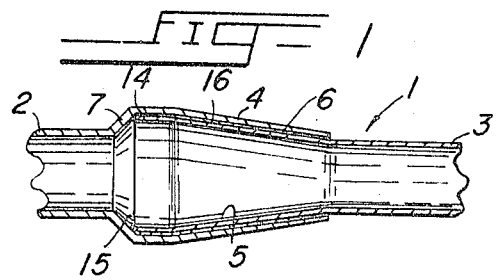
FIG. 1 is a longitudinal sectional view through a tube joint embodying the principles of the present invention, showing the joint in fully assembled position.
Figure 2:
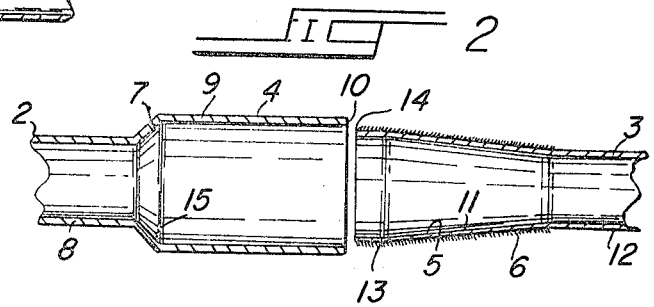
FIG. 2 is a longitudinal sectional view through the tubes shown in FIG. 1, showing the tubes prior to assembly.
Figure 3:
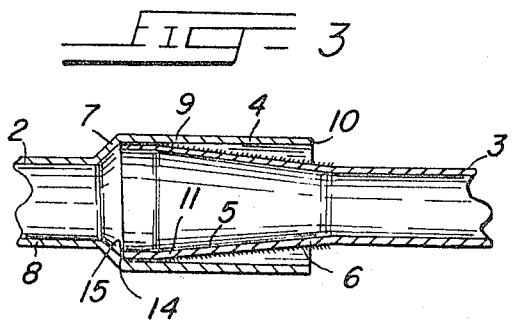
FIG. 3 is a longitudinal sectional view through the tubes shown in FIG. 1, showing the tubes in partially assembled position relative to each other.

A tube joint 1, embodying the principles of the present invention, is shown in FIGS. 1 to 3, inclusive, of the drawings to illustrate the presently preferred embodiment of the present invention.

The tube joint 1 is afforded between an outer tubular member 2 and an inner tubular member 3. In the drawings, the tubular members 2 and 3 are shown as being end portions of elongated, straight pipe sections, or the like. However, as will be appreciated by those skilled in the art, this is merely by way of illustration and not by way of limitation and either one or both of the tubular members 2 and 3 could be end portions of a more complicated tubular construction, such as, for example, of a reverse bend in a refrigeration or air conditioning coil, or of a fitting or connector, such as, for example, a T-fitting, or the like.

In the tube joint shown in FIG. 1, the tubular member 2 has an enlarged portion or bell 4 formed at one end thereof, and, likewise, the tubular member 3 has an enlarged portion or bell 5 formed at one end thereof. In the assembled tube joint 1, the bell 5 is disposed within the bell 4, with the bell 4 disposed in tight-fitting, surrounding relation to the bell 5, and with an adhesive sealant 6 disposed between the bells 4 and 5, as will be discussed in greater detail presently.

In the construction of the preferred tube joint 1, the bell 4 is initially formed on an end of the tube 2 in a manner to afford an outwardly flaring or outwardly tapering end portion 7 immediately adjacent the body portion 8 of the tube 2, and with a cylindrical portion 9 extending axially outwardly from the side of the outwardly flaring portion 7 remote from the main body portion 8 of the tubular member 2 to the free end 10 of the bell 4.

Also, in the construction of the tube joint 1, the bell 5 is constructed on the tubular member 3 in such a manner as to afford an outwardly flaring or outwardly tapering end portion 11 immediately adjacent the body portion 12 of the tubular member 3, and with a cylindrical portion 13 extending axially outwardly from the outwardly flaring portion 11 to the free end 14 of the bell 5.

The primary differences in the initial formation of the bells 4 and 5 are that in the bell 4, the outwardly flaring portion 7 is preferably a small part of the overall length thereof, and the cylindrical portion 9 is the major portion of the length thereof; whereas, on the tubular member 3, the outwardly flaring portion 11 is the major part of the overall length of the bell 5, and the cylindrical portion 13 is a minor part of this length; and the outside diameter of the cylindrical portion 13 is less than that of the cylindrical portion 9, the difference in diameter preferably being such that when the cylindrical portion 13 is inserted into the cylindrical portion 9, it engages therein with a press fit.

Preferably, before inserting the bell 5 into the bell 4, the entire outer surface of the bell 5 is coated with the adhesive sealant 6, or, at least, the outer surface of the bell 5 is so coated from the body portion 12 onto the inner edge of the cylindrical portion 13. The adhesive sealant 6 is a sealant which is adhesive to the material of both of the tubular members 2 and 3. It is a material which both assists in securing the two tubular members 2 and 3 together, and provides a sealant which is effective to insure against leakage of gas, or the like, through the joint 1. It may be any suitable material, such as, for example, one of the well known epoxy resins, which have the necessary toughness, flexibility and strength to withstand the normal distortions, stresses and strains encountered by joints of the type intended.

After the outer surface of the bell 5 has thus been coated, it may be inserted axially into the bell 4 to a position wherein the free edge 14 thereof is disposed in abutting engagement with the shoulder 15 afforded by the edge portion of the inner face of the outwardly flaring portion 7, which is disposed adjacent to the junction thereof with the cylindrical portion 9. It will be remembered that the diameter of the cylindrical portion 13 of the bell 5 is such that, when it is inserted in the bell 4, it is disposed therein with a press fit. Such construction has two important purposes and advantages. One of these advantages, of course, is that a structurally strong, tight sealing connection is afforded between the cylindrical portion 13 of the bell 5 and the interengaging portion of the bell 4. Another advantage is that with this construction, when the bell 5 is being inserted into the bell 4, the outer surface of the cylindrical portion 13 is engaged with the inner surface of the cylindrical portion 9 with a firm wiping fit which is effective not only to insure that the adhesive sealant 6 does not flow forwardly around the free end 14 of the bell 5 and thus enter the internal portions of the tube joint 1 engaged by the working fluid, but, in fact, tends to force the adhesive sealant 6 on the cylindrical portion 13 away from the free end 14 of the bell 5 and deposit it on the outwardly flaring portion 6.

In making the tube joint 1, after the coated bell 5 has thus been inserted into the bell 4, the cylindrical portion 9 of the bell 4 shown in FIG. 3, is progressively reduced in diameter from the peripheral line disposed radially outwardly of the junction of the cylindrical portion 13 and the outwardly flaring portion 11 of the bell 5 to the free end 10 of the bell 9, to form an inwardly sloping or tapering end portion 16, which is disposed in closely surrounding tight fitting relation to the outwardly flaring portion 11 of the bell 5, as shown in FIG. 1. Preferably, the reduction in diameter of the end portion 16 of the bell 4 is such that it is disposed around the outwardly tapering portion 11 of the bell 5 with a fit which is not substantially less than a press fit, thus compressing the adhesive sealant 6 to a thin coating. Also, the end portion 16 preferably is the same length as outwardly flaring portion 11, so that it completely covers the latter.

Such reduction in the diameter of the end portion 16 of the bell 4 may be made in any suitable forming machine, such as, for example, by engaging the end portion 16 with a roller on a suitable spinning machine. In forming the preferred tube joint 1, the reduction in diameter of the end portion 16 of the bell 4 preferably is progressively made from the aforementioned peripheral line disposed radially outwardly of the inner edge of the cylindrical portion 13 to the free end 10 of the bell 4. Reducing the size of the end portion 16 of the bell 4 in this manner tends to effectively, progressively squeeze any excess adhesive sealant 6 disposed between the outwardly flaring portion 11 of the bell 5 and the end portion 16 of the bell 4 toward the free end 10 of the bell 4, from which it may be discharged onto the outer surface of the body portion 12 of the tubular member 3, and from which, if desired, it may be readily removed by wiping, sanding, grinding, or the like.

After the end portion 16 of the bell 4 has thus been reduced in diameter, the adhesive sealant 6 disposed between the bells 4 and 5 may be permitted to set. This may be accomplished in any suitable manner, depending upon the adhesive sealant used. For example, if the adhesive sealant 6 is an epoxy resin, the setting thereof may be accomplished by curing the same by the application of heat to the joint 1 for a suitable length of time, as will be appreciated by those skilled in the art.

With the tube joint 1 constructed in the manner shown herein, it will be seen that the tubular members 2 and 3 are firmly and positively, structurally held again any axial movement relative to each other. The physical interlock afforded between the bells 4 and 5 is such that inward telescopic movement of the tubular members 2 and 3 relative to each other is prevented in a positive manner by the engagement of the end 14 of the bell 5 with the shoulder 15 on the bell 4; and outward telescopic movement of the tubular members 2 and 3 relative to each other is prevented in a positive manner by the inwardly tapering, surrounding engagement of the end portion 16 of the bell 4 with the adhesively coated outer face of the substantially complementary portion 11 of the bell 5.

In addition to insuring against axial movement of the tubular members 2 and 3 relative to each other, this construction of the tube joint 1 protects the adhesive sealant 6 against practically all, if not all, shear stress in a direction axially of the joint 1. The latter is of importance in tubular joints, because, as is well known in the art, adhesive sealants commonly have a relatively low shear strength as compared to their tensile strengths, and it is not uncommon for tubing, of the type which requires joints between tubular members, to be subjected to substantial forces longitudinally thereof in a direction tending to telescope the joined members either inwardly or outwardly relative to each other.

With the bells 4 and 5 disposed relative to each other with the aforementioned, preferred tight fit, the tubular members 2 and 3 are not only firmly held thereby against axial movement relative to each other, but are also firmly held against rotation, or movement in any direction relative to each other. In addition, the adhesive sealant 6, by its adhesion to the bells 4 and 5, assists in holding the tubular members 2 and 3 against movement relative to each other, and particularly against rotation relative to each other. Also, the adhesive sealant 6 affords sealing material which provides added protection against the leakage of working fluid through the tube joint 1.

As just described, in the preferred form of the tube joint 1, the adhesive sealant 6 is disposed between the portions 11 and 16 thereof. In certain installations, such as, for example, in refrigeration and air conditioning installations, and the like, wherein working fluids such as refrigerants are disposed in the tubular members 2 and 3 under relatively high pressures, such construction is highly desirable. However, if desired a joint having the construction of the joint 1, except that no adhesive or sealant is disposed between the bells 4 and 5, may be afforded without departing from the broader aspects of the present invention. In the construction of such a joint, the same method and construction is used, except that no coating such as the adhesive sealant 6 coating is applied to the parts of the joint, the portion 16 being directly engaged with the portion 11 with a tight fit.

Figure 4:
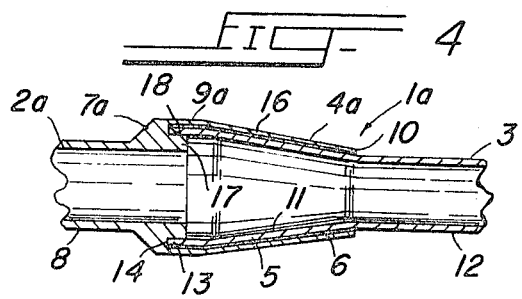
FIG. 4 is a longitudinal sectional view similar to FIG. 1, showing a modified form of the present invention.

In FIG. 4, a modified form of the present invention is shown. The modified form of tube joint shown in FIG. 4 operates on the same general principle as the preferred form of tube joint shown in FIGS. 1–3, and like reference numerals have been used on like parts and the same reference numerals with the suffix $a$ have been used on parts which are similar, but which have been substituted for parts of the preferred form of the present invention. All of the changes made in the modified form of the present invention over the preferred form are embodied in the bell 4a of the tubular member 2a.

It will be noted that the changes made in the modified form of my invention shown in FIG. 4 comprise the following: the bell 4a embodies an inwardly projecting annular ring 17 disposed within the cylindrical portion 9a of the assembled tube joint 1a and projecting axially outwardly from the outwardly flaring portions 7a; and a recess 18 is formed in the ring 17 in position to receive the free edge portion of the cylindrical portion 13 of the bell 5, when the cylindrical portion 13 is disposed in operative engagement with the cylindrical portion 9a of the bell 4a.

The ring 17, with the recess 18 formed therein, may be formed in any suitable manner such as, for example, by an upsetting operation. In the construction of the tube joint 1a, as in the construction of the tube joint 1, the bells 4a and 5 are first formed on the tubular members 2a and 3, respectively, with the portion 9a of the bell 4a being cylindrical in shape throughout its length. Thereafter, the adhesive sealant 6 may be applied to the outer surface of the bell 5, and the coated bell 5 may then be inserted into the bell 4a into position wherein the cylindrical portion 13 is fully seated in the recess 18. As is true in the preferred form of the invention shown in FIG. 1, the cylindrical portion 13 of the bell preferably is disposed in the cylindrical portion 9a of the bell 4a with a press fit.

Thus, the tube joint 1a has the advantage which was described in greater detail with respect to the tube joint 1, of effectively preventing adhesive sealant from moving inwardly around the free end 14 of the bell 5, by the wiping contact between the circular portions 9a and 13. In addition, the interlocking engagement of the cylindrical portion 13 with the ring 17 tends to further insure against such inward flow of the adhesive sealant 6.

Also, the tube joint 1a affords additional sealing characteristics against leakage therethrough, the interlocking engagement of the cylindrical portion 13 and the rib 17 affording a tortuous path around the free end portion of the bell 5 so as to further deter any leakage of working fluid between the bells 4a and 5.

Figure 5:
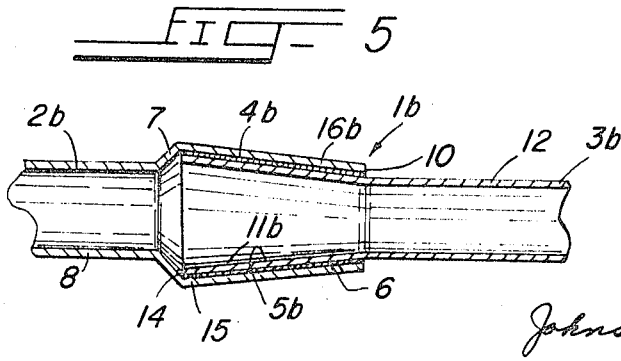
FIG. 5 is a longitudinal sectional view similar to FIG. 1, showing another modified form of the present invention.

In FIG. 5, another modified form of the present invention is shown. The modified form of tube joint which is shown in FIG. 5 operates on the same principle as the preferred form of tube joint illustrated in FIGS. 1–3, and like reference numerals have been used on like parts and the same reference numerals with the suffix $b$ have been used on parts which are similar but which have been substituted for parts of the preferred form of the present invention.

It will be noted that the changes made in the modified form of the present invention shown in FIG. 5 over the preferred form of the invention shown in FIG. 1, comprise the following: the cylindrical portion 9 of the assembled tube joint 1 has been eliminated, the inwardly sloping or tapering portion 16b of the bell 4b on the tubular member 2b extending the entire distance from the outer edge of the outwardly portion 7 to the free end 10 of the bell 4b; and the cylindrical portion 13 on the bell 4 of the tube joint 1 shown in FIG. 1 has been eliminated, the outwardly flaring portion 11b of the bell 4b on the tubular member 3b extending the entire distance from the body portion 12 of the tubular member 3b to the free end 14 of the bell 5b.

In the construction of the tube joint 1b, the bell 4b is initially formed with the outwardly flaring portion 7 and the portion 16b constituted and arranged in the same manner as the outwardly flaring portion 7 and the cylindrical portion 9 of the bell 4 shown in FIG. 1. In the initial formation of the bell 5b, it is flared outwardly throughout its length in such a manner that the outer diameter thereof at the free end 14 is such that when the bell 5b is inserted into the bell 4b, with the portion 16b disposed in the aforementioned cylindrical form throughout its length, the free edge portion of the portion 11b of the bell 5b engages the interior of the portion 16b of the bell 4b with a press fit.

Prior to the insertion of the bell 5b into the bell 4b, the outer surface of the bell 11b is preferably coated with the adhesive sealant 6. However, in this instance, it is preferable that the coating not be extended to the outer edge of the outwardly flaring portion 11b, but that it stop in spaced relation thereto so as to aid in insuring that the sealant will not flow outwardly around the free end 14 of the bell 5b. After the thus coated bell 5b has been inserted into the bell 4b, with the free end 14 thereof disposed in abutting engagement with the shoulder 15 formed at the junction of the outwardly flaring portion 7 and the portion 16b of the bell 4b, the diameter of the then cylindrical portion 16b may be reduced in the same manner as heretofore described with respect to the portion 16 into tight enclosing relation to the entire length of the outwardly flaring portion 11b of the bell 5b.

It will be observed that in each of the forms of the invention shown in FIGS. 1 to 5, inclusive, of the drawings, a tube joint is afforded wherein the joined tubular members are physically interlocked in a manner to afford a reliable, positive structural restraint against axial movement of the tubular members in any direction relative to each other.

In addition, it will be seen that each of the forms of the invention shown in the drawings are so constituted and arranged as to effectively insure against the entry of adhesive sealant into the portions of the tube joint contacted by working fluid passing axially therethrough.

In addition, it will be seen that each of the forms of the present invention shown in the drawing affords a novel tube joint wherein tubular members having body portions of the same cross sectional size may be effectively joined together in a novel and expeditious manner, without affording a restriction to the flow of working fluid therethrough.

In addition, it will be seen that each of the forms of the present invention shown in the drawings affords a novel tube joint which is highly practical for joining together tubes made of metal, such as, for example, aluminum, copper or steel, with the joints made up from any combination of such materials. Preferably, if tubular members made from two different materials are being joined together with either one of the joints 1, 1a or 1b, the tubular member made of the softer material, such as, for example, aluminum, will be the member having the outer bell 4, 4a or 4b, and the tubular member made of the harder material, such as, for example, copper or steel, will have the inner bell member 5 or 5b. However, the present invention is not limited to such construction, and, if desired, tubular members made of the same material may be so joined together.

From the foregoing it will be seen that the present invention affords tube joints which are practical and efficient in operation, and which may be readily and economically produced commercially.

Thus, while I illustrated and described the preferred embodiments of my invention, it is to be understood that these are capable of variation and modification, and I therefore do not wish to be limited to the precise details set forth, but desire to avail myself of such changes and alterations as fell within the purview of the following claims.

I claim:
1. A tube joint comprising
   (a) a tubular member having
       (1) a body portion, and
       (2) a bell at one end of said body portion, and
   (b) another tubular member having
       (1) another body portion, and
       (2) another bell at one end of said other body portion
   (c) said other bell having a portion flaring outwardly from said other body portion,
   (d) said first mentioned bell having an inwardly sloping portion disposed around said outwardly flaring portion in surrounding relation thereto in position to prevent axially outward movement of said tubular member relative to each other,
   (e) said first mentioned bell having a portion flaring outwardly from said first mentioned body portion
       (1) between said first mentioned body portion and said inwardly sloping portion, and
       (2) forming a shoulder in said first mentioned bell,
   (f) said other bell being disposed in abutting engagement with said shoulder,
   (g) said first mentioned bell having a cylindrical portion disposed between said outwardly flaring and inwardly sloping portions thereof,
   (h) said other bell having a cylindrical end portion on the side of said outwardly flaring portion thereof remote from said other body portion, and
   (i) said last mentioned cylindrical end portion being disposed
       (1) radially inwardly of said first mentioned cylindrical portion, and
       (2) in abutting engagement with said shoulder.
2. A tube joint as defined in claim 1, and in which
   (a) said cylindrical end portion is disposed in said cylindrical portion with a press fit.
3. A tube joint comprising
   (a) a tubular member having
       (1) a body portion, and
       (2) a bell at one end of said body portion, and
   (b) another tubular member having
       (1) another body portion, and
       (2) another bell at one end of said other body portion
   (c) said other bell having a portion flaring outwardly from said other body portion,
   (d) said first mentioned bell having an inwardly sloping portion disposed around said outwardly flaring portion in surrounding relation thereto in position to prevent axially outward movement of said tubular members relative to each other,
   (e) said first mentioned bell having a portion flaring outwardly from said first mentioned body portion between said first mentioned body portion and said inwardly sloping portion, and
   (f) said other bell being disposed in abutting engagement with the edge portion of said outwardly flaring portion of said first mentioned bell remote from said first mentioned body portion,
   (g) said first mentioned bell having a cylindrical portion disposed between said outwardly flaring and inwardly sloping portions thereof,
   (h) said other bell having a cylindrical end portion on the side of said outwardly flaring portion thereof remote from said other body portion, and
   (i) said cylindrical end portion
       (1) being disposed in said first mentioned cylindrical portion, and
       (2) being the portion of said other bell disposed in said abutting engagement with said edge portion.
4. A tube joint as defined in claim 3, and in which
   (a) said inwardly sloping portion is disposed in tight fitting relation to said first mentioned outwardly flaring portion, and
   (b) a sealing adhesive is disposed between said inwardly sloping portion and said first mentioned outwardly flaring portion in adhesively-coating engagement therewith.
5. The method of making a tube joint comprising
   (a) forming a bell on one tubular member having a body portion with
       (1) said bell having a portion tapering outwardly from said body portion, and
       (2) the remainder of said bell comprising a cylindrical portion projecting from said outwardly tapering portion on the side thereof remote from said body portion,
   (b) forming another bell on another tubular member having another body portion with
       (1) said other bell having another portion tapering outwardly from said other body portion,
   (c) coating the outer surface of said other outwardly tapering portion with a sealing adhesive,
   (d) inserting said coated other bell with a press fit into said first mentioned bell into engagement with said first mentioned outwardly tapering portion,
   (e) progressively forming said first mentioned cylindrical portion in a direction away from said first mentioned outwardly tapering portion into snug fitting, substantially parallel surrounding relation to said coated other outwardly tapering portion, and
   (f) setting said sealing adhesive.
6. The method of making a tube joint comprising
   (a) forming a bell on one tubular member having a body portion with
       (1) said bell having a portion tapering outwardly from said body portion, and
       (2) the remainder of said bell comprising a cylindrical portion projecting from said outwardly tapering portion on the side thereof remote from said body portion,
   (b) forming another bell on another tubular member having another body portion with
       (1) said other bell having another portion tapering outwardly from said other body portion,
   (c) coating the outer surface of said other outwardly tapering portion with a sealing adhesive,
   (d) inserting said coated other bell into said first mentioned bell into engagement with said first mentioned outwardly tapering portion,
   (e) progressively forming said first mentioned cylindrical portion in a direction away from said first mentioned outwardly tapering portion into snug fitting, substantially parallel surrounding relation to said coated other outwardly tapering portion, and
   (f) setting said sealing adhesive,
   (g) said forming of said other bell including forming a cylindrical end portion on the side of said other outwardly tapering portion remote from said other body portion, and (h) said inserting of said other bell into said first mentioned bell including inserting said cylindrical end portion with a press fit into said first mentioned cylindrical portion into abutting engagement with said first mentioned outwardly tapering portion.

7. A tube joint comprising
(a) a tubular member having
   (1) a body portion, and
   (2) a bell at one end of said body portion,
(b) another tubular member having
   (1) another body portion, and
   (2) another bell at one end of said other body portion,
(c) said first mentioned bell having
   (1) an inwardly sloping portion, and
   (2) an outwardly flaring portion
     (a′) disposed between said first mentioned body portion and said inwardly sloping portion, and
     (b′) sloping outwardly at an acute angle from said first mentioned body portion to a juncture with said sloping portion,
(d) said other bell
   (1) having a portion flaring outwardly from said other body portion, and
   (2) having a free edge disposed in abutting engagement with said juncture and in a press fit engagement therewith, and
(e) said inwardly sloping portion of said first mentioned bell being disposed around said outwardly flaring portion of said other bell in surrounding relation thereto in position to prevent axially outward movement of said tubular members relative to each other.

References Cited

UNITED STATES PATENTS

| | | | |
|---|---|---|---|
| 1,951,122 | 3/1934 | Balze | 29—470.5X |
| 2,874,938 | 2/1959 | Higgins | 29—511 |
| 3,343,252 | 9/1967 | Reesor | 29—458 |

FOREIGN PATENTS

| | | | |
|---|---|---|---|
| 84,551 | 6/1921 | Austria | 285—374 |
| 351,116 | 6/1931 | Great Britain | 285—382 |

DAVE W. AROLA, Primary Examiner

U.S. Cl. X.R.

29—458, 511, 520; 285—331, 334.5, 382